(12) United States Patent
Repasi et al.

(10) Patent No.: US 8,887,278 B2
(45) Date of Patent: *Nov. 11, 2014

(54) RESTRICTING A PROCESSING SYSTEM BEING COMPROMISED WITH A THREAT

(75) Inventors: Rolf Repasi, Sunrise Beach (AU); Simon Clausen, New South Wales (AU)

(73) Assignee: Symantec Corporation, Mountain View, CA (US)

(*) Notice: Subject to any disclaimer, the term of this patent is extended or adjusted under 35 U.S.C. 154(b) by 2036 days.

This patent is subject to a terminal disclaimer.

(21) Appl. No.: 11/854,741

(22) Filed: Sep. 13, 2007

(65) Prior Publication Data

US 2008/0072324 A1 Mar. 20, 2008

Related U.S. Application Data

(60) Provisional application No. 60/844,773, filed on Sep. 15, 2006.

(51) Int. Cl.
*G06F 12/14* (2006.01)
*G06F 21/56* (2013.01)

(52) U.S. Cl.
CPC ...... *G06F 21/566* (2013.01); *G06F 2221/2115* (2013.01)
USPC .............................. 726/23; 726/22

(58) Field of Classification Search
CPC .................. H04L 63/1416; H04L 63/1408
USPC ........................................ 726/22–25
See application file for complete search history.

(56) References Cited

U.S. PATENT DOCUMENTS

| | | | |
|---|---|---|---|
| 2003/0135791 A1* | 7/2003 | Natvig | 714/38 |
| 2005/0055559 A1* | 3/2005 | Bucher | 713/188 |
| 2007/0174915 A1* | 7/2007 | Gribble et al. | 726/24 |
| 2010/0005531 A1* | 1/2010 | Largman et al. | 726/24 |

* cited by examiner

*Primary Examiner* — Farid Homayounmehr
*Assistant Examiner* — Suman Debnath
(74) *Attorney, Agent, or Firm* — Holland & Hart LLP

(57) ABSTRACT

A method, system, computer readable medium of instructions and/or computer program product. The method comprises receiving, in a proxy server, response data from a remote processing system, according to a request from the client processing system to download data from the remote processing system; using, in one or more emulated operating systems of the proxy server, the downloaded data; monitoring behavior of the use of the data in the one or more emulated operating systems; and in response to detecting malicious behavior indicative of a threat, restricting the client processing system being compromised with the threat of the response data.

17 Claims, 8 Drawing Sheets

US 8,887,278 B2

RESTRICTING A PROCESSING SYSTEM BEING COMPROMISED WITH A THREAT

This application claims the benefit of priority from U.S. Provisional Patent Application No. 60/844,773 filed Sep. 15, 2006, and is incorporated by referenced.

TECHNICAL FIELD

The present invention generally relates to the field of computing, and more particularly to a method, system, computer readable medium of instructions and/or computer program product for restricting a processing system being compromised with a threat.

COPYRIGHT

A portion of the disclosure of this patent document contains material that is subject to copyright protection. The copyright owner has no objection to the facsimile reproduction by anyone of the patent disclosure, as it appears in a Patent Office patent files or records, but otherwise reserves all copyrights whatsoever.

BACKGROUND ART

As used herein a "threat" comprises malicious software, also known as "malware" or "pestware", which comprises software that is included or inserted in a part of a processing system for a harmful purpose. The term threat should be read to comprise possible, potential and actual threats. Types of malware can comprise, but are not limited to, malicious libraries, viruses, worms, Trojans, adware, malicious active content and denial of service attacks. In the case of invasion of privacy for the purposes of fraud or theft of identity, malicious software that passively observes the use of a computer is known as "spyware".

There are currently a number of techniques to restrict threats such as malware compromising a processing system.

One technique comprises using database driven malware techniques which detect known malware. In this technique, a database is used which generally comprises a signature indicative of a particular type of malware. The signatures are then compared to the downloaded entity, such as an executable file, to determine if the entity is malicious.

However, this technique suffers from a number of disadvantages. This technique can only detect known malware. If there is no signature in the database for a new variant of malware, the malicious entity could go undetected, and thus compromise the processing system.

Another technique used is code-signing. Code-signing attempts to assure users that downloaded software, such as an executable file downloaded from a web-site, has been supplied by a trusted software vendor that is participating in an infrastructure of trusted entities. Such a trusted infrastructure is available using Microsoft™ Authenticode. This mechanism generally involves the use of digital signatures and certificates in order to verify the software vendor.

However, code-signing also suffers from disadvantages. Firstly, code-signing does not analyse whether the downloaded software is malicious. It only guarantees that the software vendor is part of the trusted infrastructure. Additionally, it is still possible that an author of malware may join the infrastructure of trusted entities, if they meet particular criteria such as an acceptable Dun & Bradstreet Rating, prior to publishing malicious software for download by the public.

Therefore there is a need for a method, system, computer program product and/or computer readable medium of instructions which addresses or at least ameliorates one or more problems inherent in the prior art.

An emulator is a module which emulates the functionality of another. Generally, emulation software is software designed to enable a processing system to emulate a specified software system that is not its own.

An Application Programming Interface (API) is an interface which an application accesses services, comprising operating system services.

A proxy server is a server which is intermediate a client processing system and the network, such as the Internet. A proxy server may be a processing system, or a software application which executes on a processing system.

Hyper Text Transfer Protocol (HTTP) is a protocol used to request and transfer files, especially web-pages and web-page components, over the Internet or other computer networks.

File Transfer Protocol (FTP) is a communications protocol for the transfer of files over a computer network.

A system registry is a database used by modern operating systems, for example Windows™ platforms. The system registry comprises information needed to configure the operating system. The operating system refers to the registry for information ranging from user profiles, to which applications are installed on the machine, to what hardware is installed and which ports are registered.

A hash function (i.e. Message Digest, eg. MD5) can be used for many purposes, for example to establish whether a file transmitted over a network has been tampered with or contains transmission errors. A hash function uses a mathematical rule which, when applied to a file, generates a hash value, i.e. a number, usually between 128 and 512 bits in length. This number is then transmitted with the file to a recipient who can reapply the mathematical rule to the file and compare the resulting number with the original number.

In a networked information or data communications system, a user has access to one or more terminals which are capable of requesting and/or receiving information or data from local or remote information sources. In such a communications system, a terminal may be a type of processing system, computer or computerised device, personal computer (PC), mobile, cellular or satellite telephone, mobile data terminal, portable computer, Personal Digital Assistant (PDA), pager, thin client, or any other similar type of digital electronic device. The capability of such a terminal to request and/or receive information or data can be provided by software, hardware and/or firmware. A terminal may comprise or be associated with other devices, for example a local data storage device such as a hard disk drive or solid state drive.

An information source can comprise a server, or any type of terminal, that may be associated with one or more storage devices that are able to store information or data, for example in one or more databases residing on a storage device. The exchange of information (ie. the request and/or receipt of information or data) between a terminal and an information source, or other terminal(s), is facilitated by a communication means. The communication means can be realised by physical cables, for example a metallic cable such as a telephone line, semi-conducting cables, electromagnetic signals, for example radio-frequency signals or infra-red signals, optical fibre cables, satellite links or any other such medium or combination thereof connected to a network infrastructure.

The reference in this specification to any prior publication (or information derived from the prior publication), or to any matter which is known, is not, and should not be taken as an acknowledgment or admission or any form of suggestion that the prior publication (or information derived from the prior publication) or known matter forms part of the common general knowledge in the field of endeavour to which this specification relates.

DISCLOSURE OF INVENTION

In one broad form there is provided a method of restricting a client processing system being compromised by a threat, wherein the method comprises:

receiving, in a proxy server, response data from a remote processing system, according to a request from the client processing system to download data from the remote processing system;

using, in one or more emulated operating systems of the proxy server, the downloaded data;

monitoring behaviour of the use of the data in the one or more emulated operating systems; and in response to detecting malicious behaviour indicative of a threat, restricting the client processing system being compromised with the threat of the response data.

In one form, the method comprises:

determining, using a cache module, if the request has previously been serviced, wherein the cache module stores analysed response data; and in the event that the request has previously been serviced, retrieving, using the cache module, analysed response data.

In some forms, the method comprises:

storing, using the cache module, analysed response data using a hash value generated based upon the response data; and retrieving, using the cache module, analysed response data using a hash value generated using received response data.

In another form the method comprises removing a portion of the response data which is associated with malicious activity.

In one embodiment, the method comprises replacing the portion removed from the response data with a non-malicious portion.

In another embodiment, upon determining that the response data requires modification, the method comprises:

generating replacement request data indicative of the data requested;

transferring, to the cache module, the replacement request data;

performing a search of stored analysed response data using the cache module to determine if a substantially similar request has previously been serviced; and receiving, from the cache module, analysed response data which at least substantially corresponds to the requested data.

In optional forms, the method comprises generating a wrapper of the analysed data, wherein the wrapper is indicative of scan data.

In additional or alternate forms, the wrapper is indicative scan data, the scan data being indicative of at least one of:

a version of a signature database used to analyse the response data;

time and/or data of conducting the analysis;

type analysis module and sub-modules used to analyse the response data;

a version number of the analysis module and the sub-modules;

a size of the response data;

a file location; and an indication as to whether the response data was code-signed.

In one aspect, the step of generating the wrapper comprises configuring the wrapper to intercept use or execution of the data by the client processing system, wherein the wrapper, upon interception of the use or execution of the data, presents the scan data.

In one form, the method comprises generating the wrapper to present a prompt requesting input regarding whether the data is to be executed or used by the client processing system, quarantined, or deleted.

In one aspect, in the event that the data downloaded is executable, the step of using the data comprises executing the data.

In another aspect, the method comprises:

recording one or more events that occur during use of the data by the one or more emulated operating systems; and analysing the one or more events to determine whether the use of the data exhibits behaviour which is indicative of a threat.

In another form, the method comprises:

selecting, in the proxy server and in accordance with the data downloaded, the one or more emulated operating systems from a plurality of emulated operating systems; and using the one or more emulated operating systems with the data to monitor the use of the behaviour of the data.

In another broad form there is provided a system to restrict a client processing system being compromised with a threat, wherein the system is configured to:

receive, in a proxy server, response data from a remote processing system, according to a request from the client processing system to download data from the remote processing system;

using, in one or more emulated operating systems of the proxy server, the downloaded data;

monitor behaviour of the use of the data in the one or more emulated operating systems; and in response to detecting malicious behaviour indicative of a threat, restrict the client processing system being compromised with the threat of the response data.

In one form, the proxy server is configured to be executed at the client processing system.

In an additional or alternate form, the proxy server is configured to be executed at a second processing system in data communication with the client processing system.

In one form, the system comprises an analysis module configured to analyse the response data, wherein the analysis module comprises at least one of:

a cryptographic hash module;

a checksum module;

a disassembly module;

a black-list and/or white list module; and a pattern matching module.

In another form there is provided a computer program product comprising a computer readable medium having a computer program recorded therein or thereon, the computer program enabling restriction of a client processing system being compromised by data downloaded from a remote processing system, wherein the computer program product configures the client processing system or a second processing system in data communication with the client processing system to:

receive, in a proxy server, response data from a remote processing system, according to a request from the client processing system to download data from the remote processing system;

using, in one or more emulated operating systems of the proxy server, the downloaded data;

monitor behaviour of the use of the data in the one or more emulated operating systems; and in response to detecting malicious behaviour indicative of a threat, restrict the client processing system being compromised with the threat of the response data.

According to another broad form, there is provided a computer readable medium of instructions for giving effect to any of the aforementioned methods or systems. In one particular, but non-limiting, form, the computer readable medium of instructions are embodied as a software program.

BRIEF DESCRIPTION OF FIGURES

An example embodiment of the present invention should become apparent from the following description, which is given by way of example only, of a preferred but non-limiting embodiment, described in connection with the accompanying figures.

MODES FOR CARRYING OUT THE INVENTION

Figure 1:
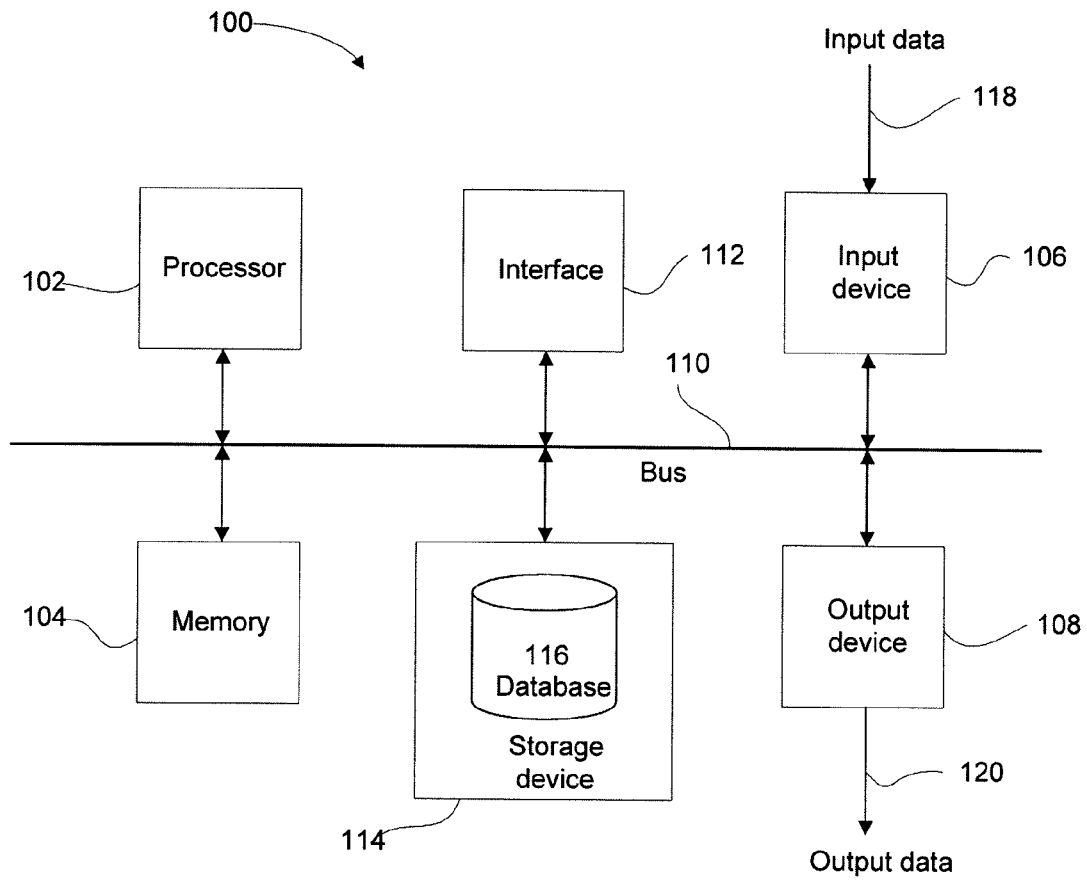
FIG. 1 illustrates a functional block diagram of an example processing system that can be utilised to embody or give effect to a particular embodiment.

The following modes, given by way of example only, are described in order to provide a more precise understanding of the subject matter of a preferred embodiment or embodiments.

In the figures, incorporated to illustrate features of an example embodiment, like reference numerals are used to identify like parts throughout the figures.

A particular embodiment of the present invention can be realised using a processing system, an example of which is shown in FIG. 1. In particular, the processing system 100 generally comprises at least one processor 102, or processing unit or plurality of processors, memory 104, at least one input device 106 and at least one output device 108, coupled together via a bus or group of buses 110. In certain embodiments, input device 106 and output device 108 could be the same device. An interface 112 can also be provided for coupling the processing system 100 to one or more peripheral devices, for example interface 112 could be a PCI card or PC card. At least one storage device 114 which houses at least one database 116 can also be provided. The memory 104 can be any form of memory device, for example, volatile or non-volatile memory, solid state storage devices, magnetic devices, etc. The processor 102 could comprise more than one distinct processing device, for example to handle different functions within the processing system 100.

Input device 106 receives input data 118 and can comprise, for example, a keyboard, a pointer device such as a pen-like device or a mouse, audio receiving device for voice controlled activation such as a microphone, data receiver or antenna such as a modem or wireless data adaptor, data acquisition card, etc. Input data 118 could come from different sources, for example keyboard instructions in conjunction with data received via a network. Output device 108 produces or generates output data 120 and can comprise, for example, a display device or monitor in which case output data 120 is visual, a printer in which case output data 120 is printed, a port for example a USB port, a peripheral component adaptor, a data transmitter or antenna such as a modem or wireless network adaptor, etc. Output data 120 could be distinct and derived from different output devices, for example a visual display on a monitor in conjunction with data transmitted to a network. A user could view data output, or an interpretation of the data output, on, for example, a monitor or using a printer. The storage device 114 can be any form of data or information storage means, for example, volatile or non-volatile memory, solid state storage devices, magnetic devices, etc.

In use, the processing system 100 is adapted to allow data or information to be stored in and/or retrieved from, via wired or wireless communication means, the at least one database 116. The interface 112 may allow wired and/or wireless communication between the processing unit 102 and peripheral components that may serve a specialised purpose. More than one input device 106 and/or output device 108 can be provided. It should be appreciated that the processing system 100 may be any form of terminal, server, specialised hardware, or the like.

The processing system 100 may be a part of a networked communications system. Processing system 100 could connect to a network, for example the Internet or a WAN. Input data 118 and output data 120 could be received from or communicated to other devices, such as a server, via the network. The network may form part of, or be connected to, the Internet, and may be or form part of other communication networks, such as LAN, WAN, ethernet, token ring, FDDI ring, star, etc., networks, or mobile telephone networks, such as GSM, CDMA or 3G, etc., networks, and may be wholly or partially wired, comprising for example optical fibre, or wireless networks, depending on a particular implementation.

Figure 2:
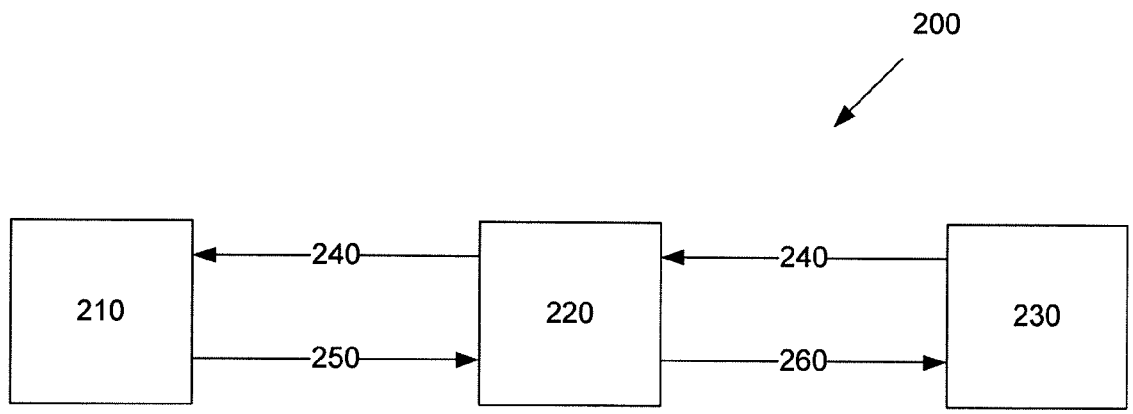
FIG. 2 illustrates a block diagram representing an example system to restrict a client processing system being compromised with a threat.

Referring now to FIG. 2 there is shown an example system to restrict a client processing system being compromised with a threat. In particular, the system 200 comprises a remote processing system 210, a proxy server 220, and a client processing system 230 which are in data communication. The proxy server 220 may be a stand alone processing system 100, however, it will be appreciated that the proxy server 220 may be a software application at either the remote processing system 210 or the client processing system 230. It will also be appreciated that client processing system 230 and remote processing system 210 may be forms of processing system 100.

When a user at the client processing system 230 attempts to download data, such as software, from the remote processing system 210, request data 240 is generated by the client processing system 230 and transferred to the proxy server 220. Generally, the proxy server 220 then transfers the request data 240 to the remote processing system 210. In accordance with the request data 240, the remote processing system 210 generates response data 250 which is transferred to the proxy server 220. The proxy server 220 uses the data, such as executing the software, in one or more emulated operating systems to analyse if the data is malicious. If the use of the data is malicious, at least a portion of the data is restricted by the proxy server 220 from compromising the client processing system 230. Analysed response data 260 can then transferred to the client processing system 230 from the proxy server 220.

Figure 3:
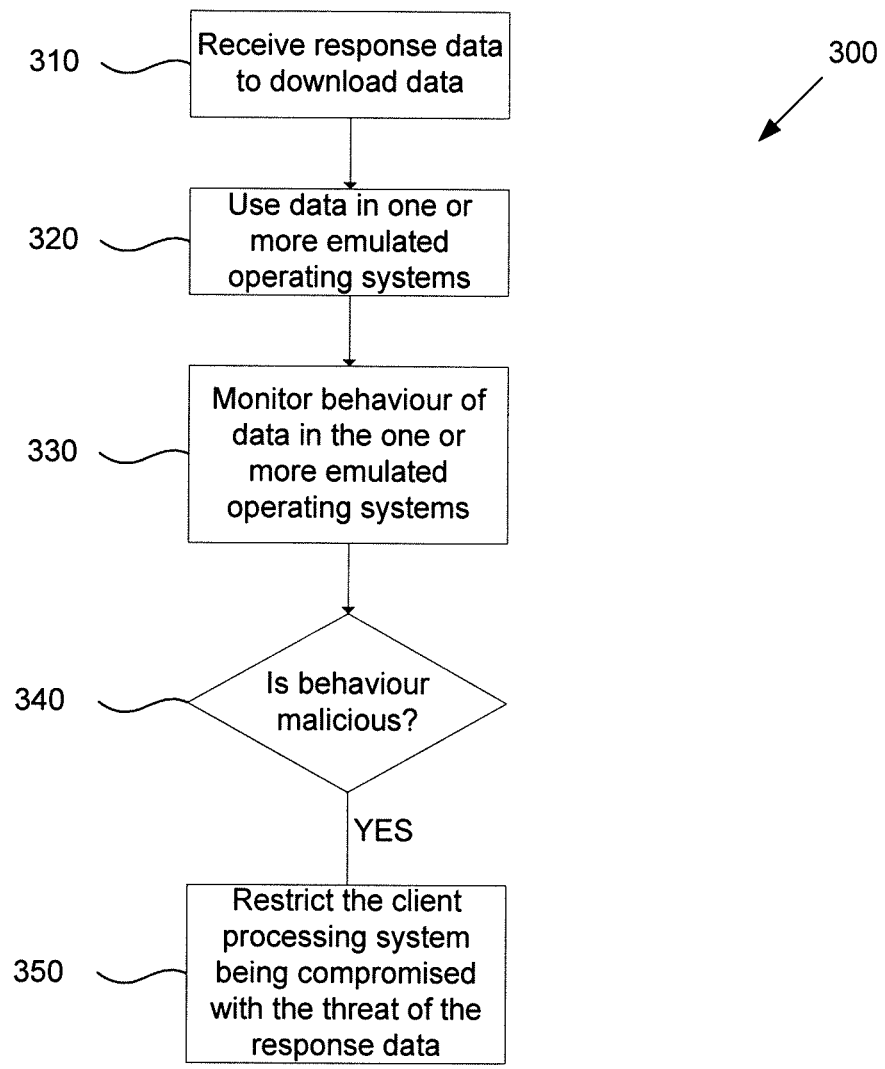
FIG. 3 illustrates a flow diagram representing an example method of restricting a client processing system being compromised with a threat.

Referring now to FIG. 3, there is shown a flow diagram illustrating an example method of restricting the client processing system 230 being compromised with a threat.

In particular, at step 310 the method 300 comprises the proxy server 220 receiving response data 250 to the request 240 to download data from the remote processing system 210. At step 320, the method 300 comprises using the data in one or more emulated operating systems. This may comprise executing downloaded software in the one or more emulated operating systems. At step 330, the method 300 comprises monitoring the behaviour of the use of the data in the one or more emulated operating systems. At step 340, the method 300 comprises determining if the behaviour of the use of the data is indicative of a threat. If the behaviour is malicious, the method 300 proceeds to step 350, wherein the proxy server 220 restricts the client processing system 230 being compromised with the threat of the response data 250.

Figure 4:
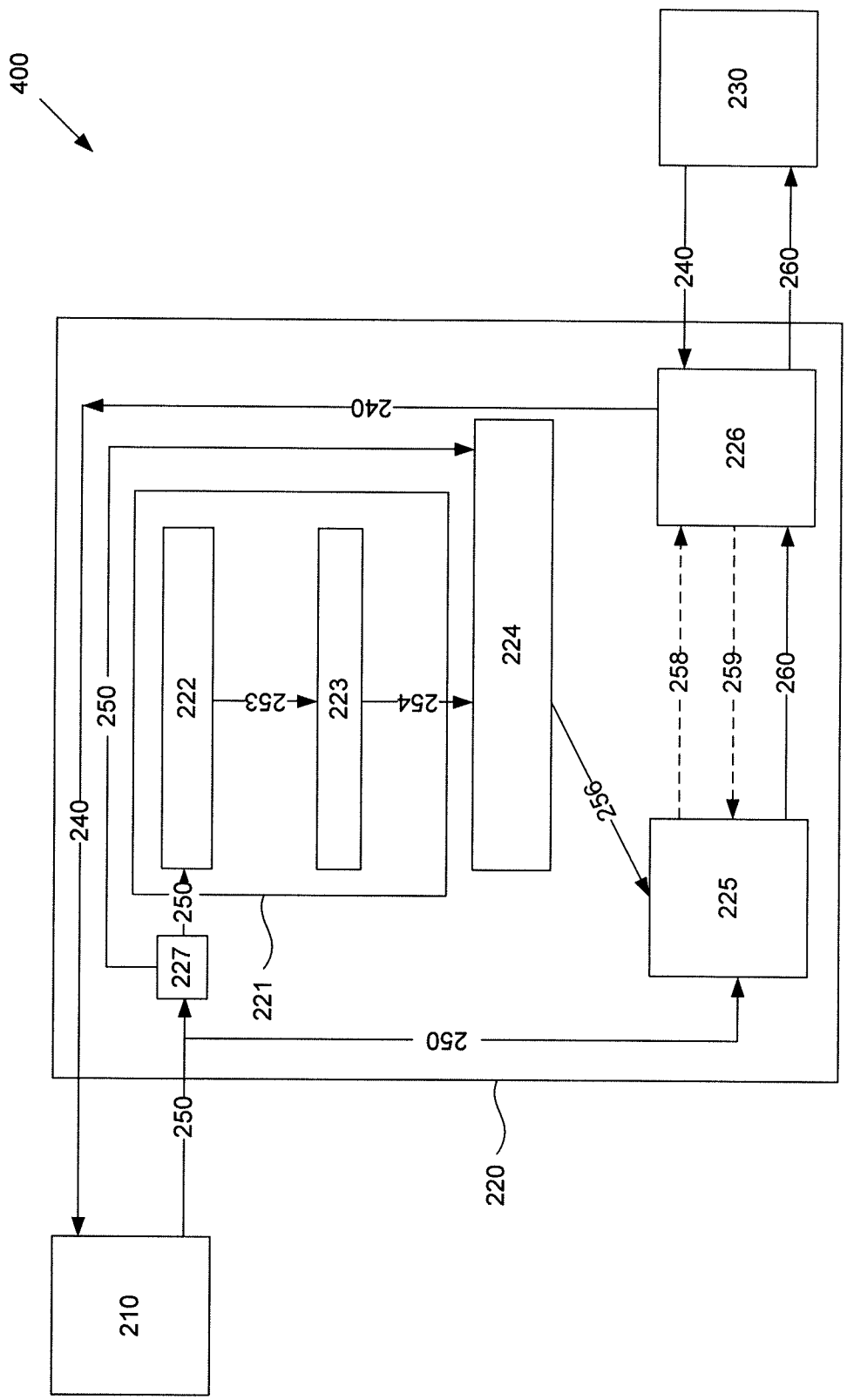
FIG. 4 illustrates a block diagram representing a more detailed example system to restrict a client processing system being compromised with a threat.
Figure 5A:
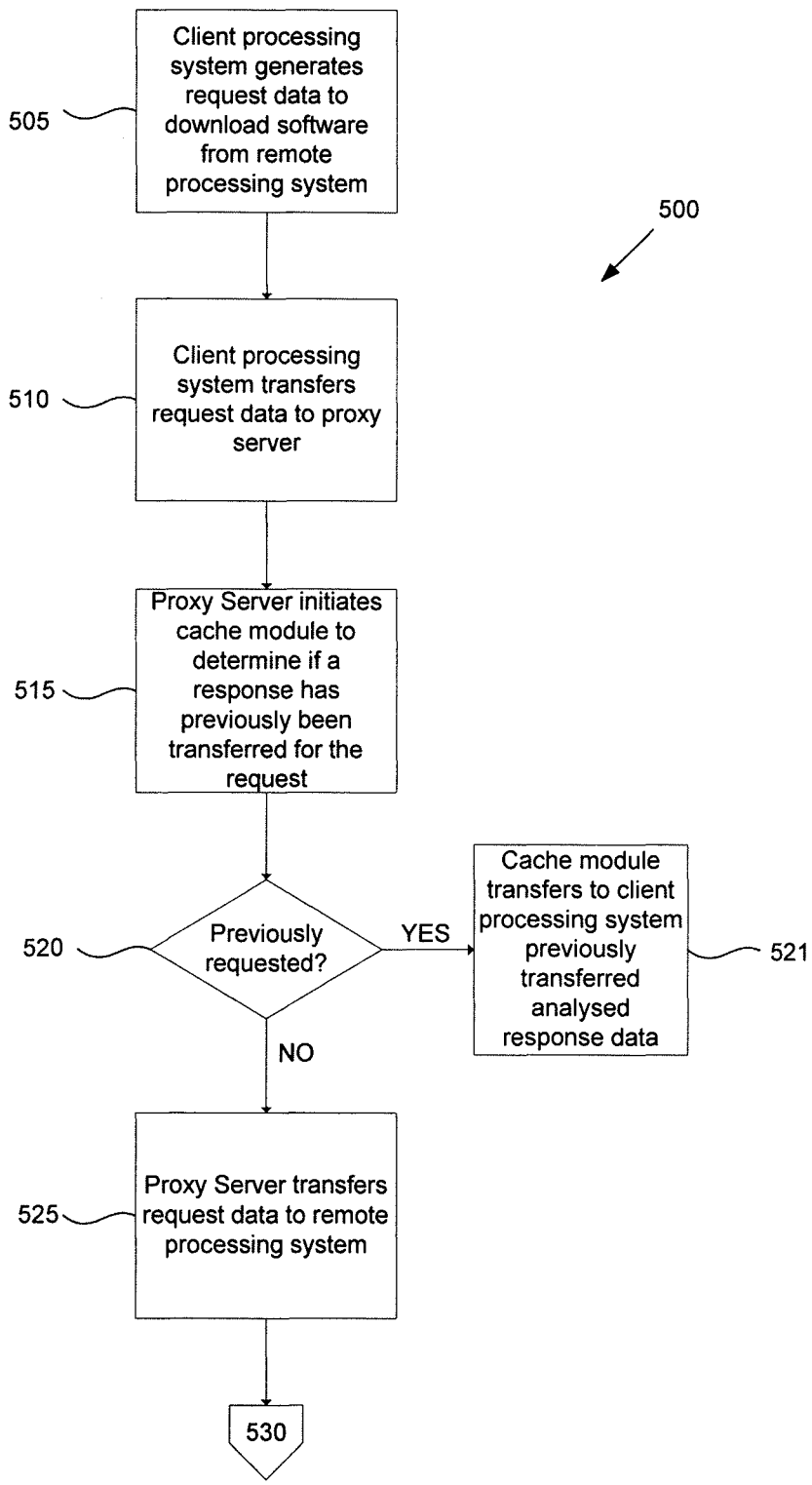
FIGS. 5A to 5D illustrate a flow diagram representing a more detailed example method to restrict a client processing system being compromised with a threat.
Figure 5B:
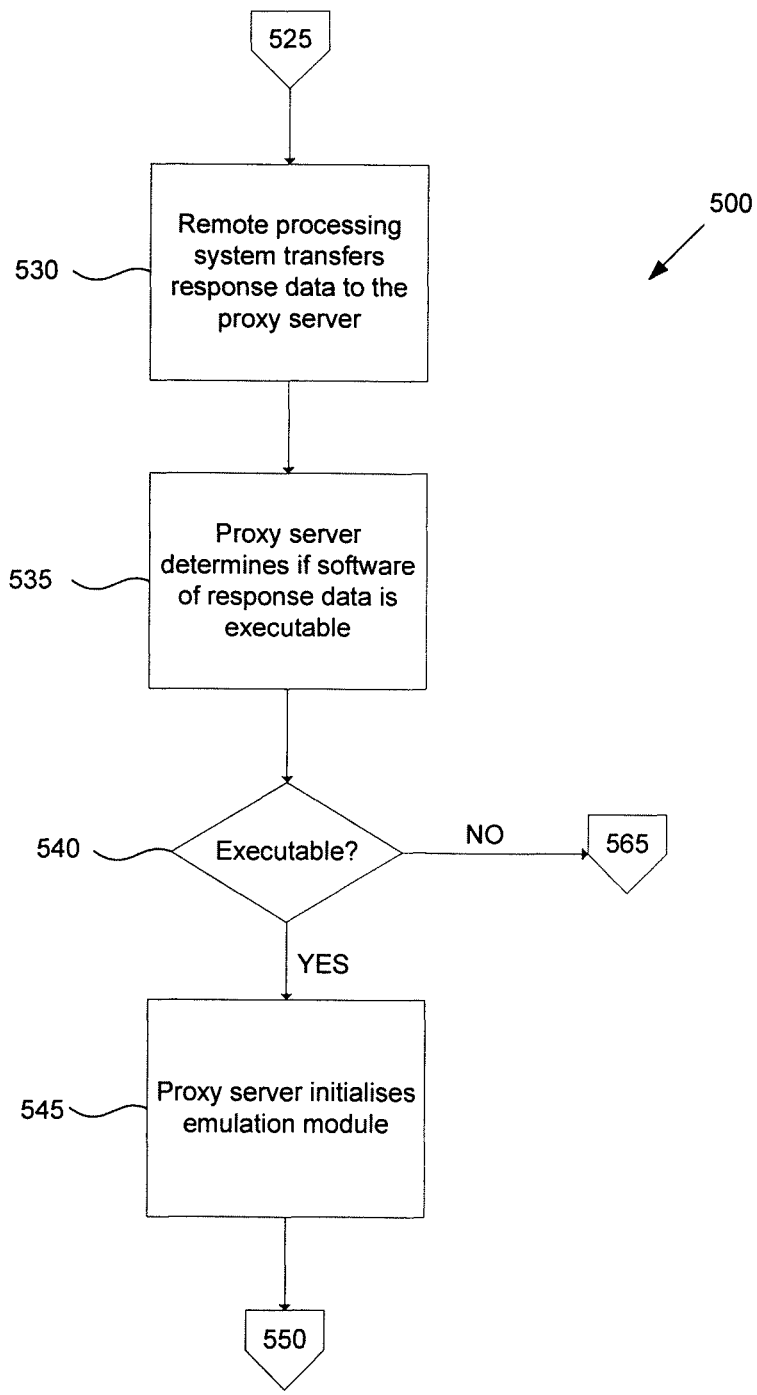
Figure 5C:
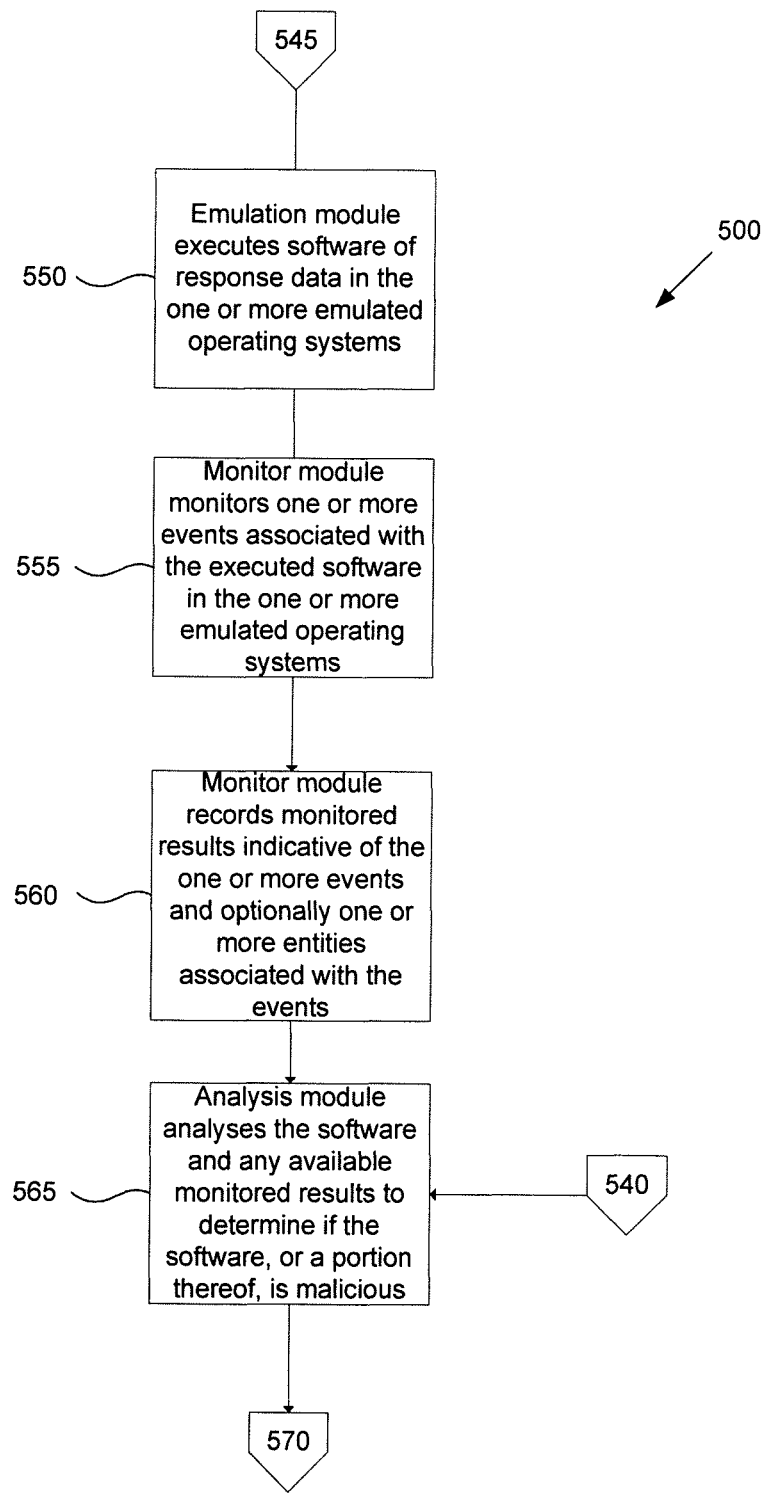
Figure 5D:
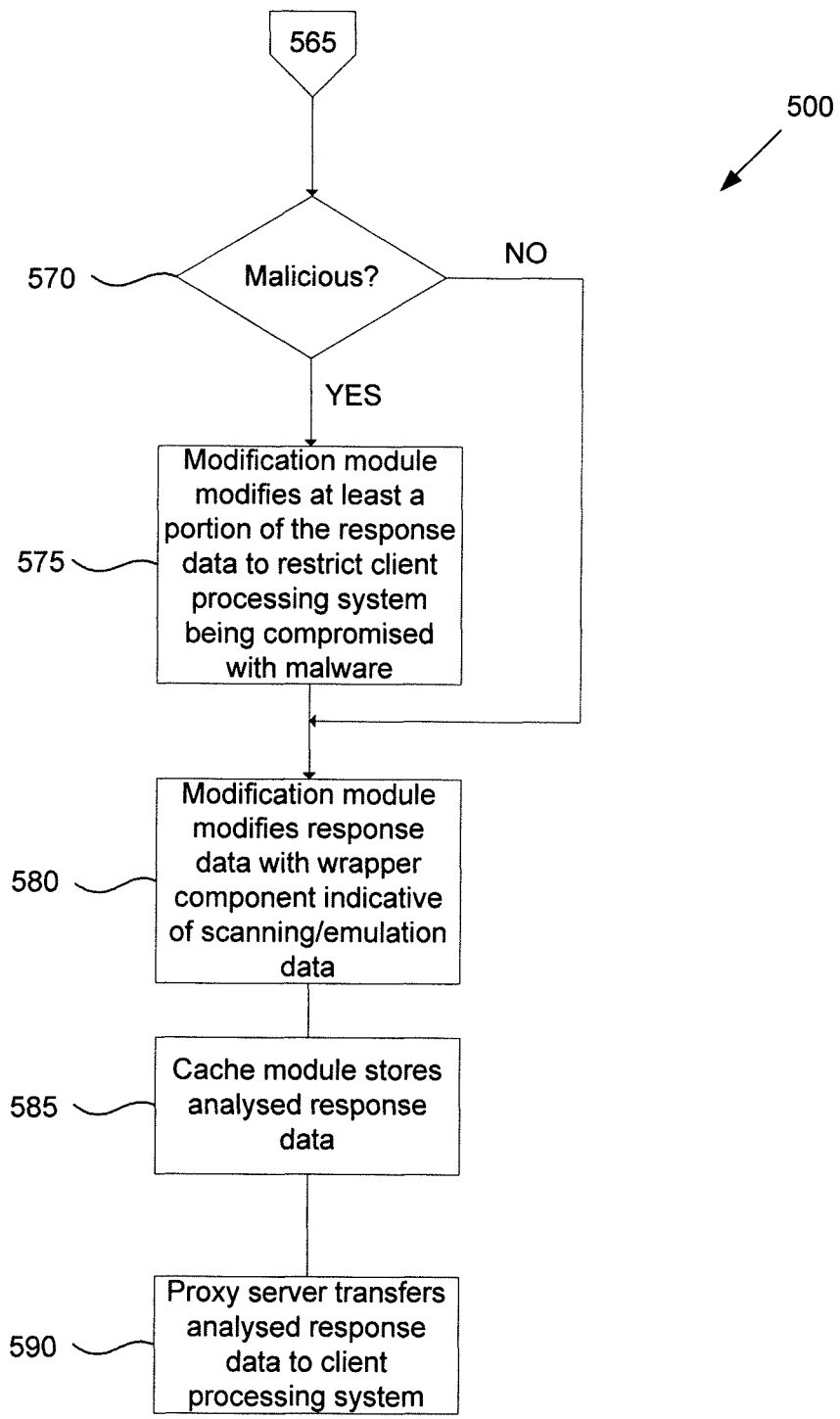

Referring now to FIG. 4, there is shown another example system 400 to restrict a client processing system 230 being compromised with a threat. Although the example system 400 is to be discussed in relation to restricting the client processing system being compromised with software, it will be appreciated that other forms of data may also be restricted from compromising the client processing system using the system 400.

In particular, the proxy server 220 comprises a number of sub-modules to analyse the response data 250 and restrict malicious software compromising the client processing system 230. The proxy server 220 comprises an executable identifier module 227, an emulation module 221, an execution module 222, a monitor module 223, an analysis module 224, a modification module 225 and a cache module 226.

When the client processing system 230 transfers request data 240 to the proxy server 220, the cache module 226 analyses the request 240 to determine if the request 240 has previously been serviced. The cache module 226 is configured to store analysed response data 260 that has been previously transferred to client processing systems 230. In one form, the cache module 226 may store a hash value of each serviced request 240 and the associated analysed response 260. The cache module 226 may be configured to determine a hash value for the received request 240, wherein records of previously serviced requests 240 are searched using the determined hash value to determine if the request 240 has been responded to previously. In the event that the received request data 240 has been previously serviced, the cache module 226 retrieves the relevant analysed response data 260 which is transferred to the client processing system 230.

In the event that the cache module 226 does not comprise a recorded response to the particular request 240, the request data 240 is transferred to the server processing system 210. When the server processing system 210 transfers the response data 250 to the proxy server 220, the executable identifier 227 analyses the software of the response data 250 to determine if the software is an executable file. In the event that the executable identifier module 227 determines that the software is not executable, the response data 250 is transferred to the analysis module 224. However, in the event that the executable identifier module 227 determines that the software is executable, the response data is transferred 250 to the emulation module 221.

The software of the response data 250 is executed in one or more emulated operating systems by the execution module 222. Events 252 that occur in relation to the executed software in the one or more emulated operating systems are monitored by the monitor module 223. The monitor module 223 may be configured to monitor particular events which are indicative of malicious behaviour associated with a threat. The monitor module can record the events of the executed software in a log file 254. The log file 254 is then transferred to the analysis module 224. A detailed explanation of monitoring behaviour of malicious software is described in the Applicant's following co-pending applications, the content of which is herein by incorporated by cross-reference: co-pending U.S. patent application Ser. No. 11/829,592 and co-pending Australian Patent application AU2007203543 entitled "Threat Identification"; co-pending U.S. patent application Ser. No. 11/829,608 and co-pending Australian Patent application AU2007203534 entitled "Real Time Malicious Software Detection"; and co-pending U.S. patent application Ser. No. 11/780,113 and co-pending Australian Patent application AU2007203373 entitled "Detecting Malicious Activity".

The analysis module 224 analyses the log file 254 to determine if the software exhibits malicious behaviour indicative of a threat. In particular, the analysis module 224 comprises a malicious behaviour module 2241 which applies a number of rules to the log file 254 to determine if the software is exhibiting malicious behaviour. Such rules may comprise:

If the executed software is a proprietary downloader which decompresses an encrypted installer that can only be detected using signatures once it has been executed in memory on a supported operating system, then the executed software is exhibiting malicious behaviour indicative of a threat; or If the executed software has no graphical user interface, and is not a console mode application; and If the executed software makes a copy of itself in an emulated system folder (for example c:\windows\system32\); and If the executed software modifies a known loadpoint in one of the emulated operating systems (for example in the system registry at HKLM\Software\Microsoft\Windows\CurrentVersion\RunOnce); and If the executed software spawns a copied version of itself; and If the newly spawned application from the executed software also fails to comprise a graphical user interface and is not a console mode application; and If the newly spawned application attempts to connect to a network or the newly spawned application attempts to accept connections from the network, then the executed software is exhibiting malicious behaviour indicative of a threat.

As will be appreciated from above example, a number of different combinations of rules can be applied to determine whether the behaviour of the executed software in the one or more emulated operating system is malicious. The malicious behaviour module 2241 may be provided in the form of a database. The analysis module 224 may also comprise other sub-modules which may be applied to executable and non-executable software to determine if the software, or a portion thereof, is malicious, as will be discussed in more detail below.

Results 256 of the analysis performed by the analysis module 224 are then transferred to the modification module 225. The response data 250 is also transferred to the modification module 225. The modification module 225 can modify, if appropriate, the software in accordance with the results 256 of the analysis. For example, the results 256 may indicate that a portion of the software is malicious. Therefore, the modification module 225 may remove the malicious portion of the software from the response data 250. The modification module 225 may optionally replace the malicious portion of the software with a non-malicious portion of software, as will be explained in more detail below. In some instances, the entire downloaded software may be considered malicious and as such may be either removed or replaced with a non-malicious version of the software, as will also be explained in more detail below. If the analysis results 256 indicate that the software is non-malicious, then the software does not require modification.

A wrapper component can be added to the analysed response data 260 to indicate scanning data and/or emulation data. The scanning data may be indicative of a version of a signature database which was used by the analysis module to analyse the response data 250. The emulation data may be indicative of at least one of: the time and/or date which the emulation was performed; the one or more emulated operating systems used to analyse the software; a version number indicative of the malicious behaviour rule module 2241; a size of the software; one or more locations in the one or more emulated operating systems which the software was executed; and whether the software is code-signed.

When the user receives the analysed response data 260 and attempts to execute the downloaded software, the wrapper component may be executed by the client processing system, displaying to the user the scanning data and/or emulation data. The wrapper component can provide a prompt to the user requesting confirmation that, based on the emulation data and/or scanning data, the user still wishes to execute the software. The user may indicate, using the input device of the client processing system 230, that the software is to be executed or that the software is to be deleted or quarantined for further analysis.

Optionally, the modification module 225 may accept the code-signed prompt, such that the user at the client processing system 230 is not prompted to perform the acceptance.

In the event that the software, or a portion thereof, is to be replaced, the modification module 225 may generate and transfer a replacement request 258 to the cache module 226. The replacement request 258 can indicate the software of the response data 250. For example, information such as name of the software, the version of the software may be comprised in the replacement request 258, and the network address of the server processing system 210 which transferred the response data 250.

In response to the replacement request 258, the cache module 226 performs a search of recorded analysed response data 260 to determine if a similar request had been previously serviced for the requested software. In the event that the cache module 226 determines a previous non-malicious version of the software had been provided to a client processing system 230 in the past, the cache module 226 may transfer the closest matching software 259, or portion thereof, back to the modification module 225. The modification module 225 may then use the closest matching software 259, or portion thereof, to modify the response data 250 so as to restrict the client processing system 230 being compromised with a threat. For example, the modification module 225 may remove a particular malicious file from the software and replace it with an earlier non-malicious version of the file which had previously been transferred to the client processing system 230. Alternatively, the entire malicious software may be removed from the response data 250, and the non-malicious version of the software may be comprised.

The analysed response data 260 is then transferred from the modification module 225 to the cache module 226 for caching. Once the cache module 226 has cached the analysed response data 260, the analysed response data 260 is then transferred from the cache module 226 to the client processing system 230.

Referring now to FIGS. 5A, 5B, 5C and 5D there is shown a more detailed flow diagram illustrating a method of restricting the client processing system being compromised with a threat. Again, although the example method 500 is to be discussed in relation to restricting the client processing system being compromised with software, it will be appreciated that other forms of data may also be restricted from compromising the client processing system using the method 500.

In particular, at step 505 the method 500 comprises the client processing system 230 generating request data 240 to download software from the remote processing system 210. This may be performed by the user selecting, using input device 106, a hyperlink in a web-page available on the Internet, wherein the hyperlink allows software to be downloaded from the remote processing system 210. At step 510, the method 500 comprises the client processing system 230 transferring the request data to the proxy server 220.

At step 515, the method 500 comprises the proxy server 220 initiating the cache module 226 to determine whether an analysed response 260 has previously been transferred to a client processing system 230 for the requested software. At step 520, if the software has previously been requested and suitable analysed response data 260 is available in the cache module 226, the method 500 proceeds to step 521 where the cache module 261 transfers to the client processing system 230 previously transferred analysed response data 260. In the event that the cache module 226 does not comprise suitable analysed response data 260 for the software requested, the method 500 proceeds to step 525 where the cache module 226 transfers the request data 240 to the remote processing system 210.

At step 530, the method 500 comprises the remote processing system 210 transferring response data 250 to the proxy server 220, wherein the response data 250 is indicative of the requested software. At step 535, the method 500 comprises the proxy server 220 initiating the executable identifier module 227 to determine if the software of the response data 250 is an executable entity. In the event that the executable identifier module 227 determines that the software is not executable, the method 500 proceeds to step 565. In the event that the executable identifier module 227 determines that the software is executable, the method continues to step 545.

At step 545, the method 500 comprises the proxy server 220 initialising the emulation module 221. This step 545 could comprise initialising the one or more emulated operating systems such that the execution of the software can be emulated. This step could optionally comprise determining the one or more operating systems which are relevant for emulating the execution of the software. For example, the software may be designed for Microsoft Windows 2000 and Microsoft Windows XP, but not for Microsoft Windows 95. As such, only the first two operating systems are initialised for emulation in the emulation module 221.

At step 550 the method 500 comprises the emulation modules executing the software of the response data 250 in the one or more emulated operating systems. Optionally, the one or more emulated operating systems can emulate execution of the software in succession or simultaneously. The one or more emulated operating systems can comprise at least one of system registry APIs, file access, creation and interaction APIs, networking APIs (such as Winsock), and process control APIs. The one or more emulated operating systems can be configured to return to the executing software a success value or an error value.

At step 555, the method 500 comprises the monitor module 223 monitoring one or more events associated with the executed software in the one or more emulated operating systems. The monitor module 223 can be configured to monitor each event that occurs in relation to the executed software. However, in more preferable forms, only particular events which are associated with a loadpoint in the emulated operating system are monitored by the monitor module 223.

At step 560, the method 500 comprises the monitor module 223 recording the one or more events. In one form, the recordings are recorded in a log file 254. Optionally, one or more entities associated with the one or more events are also recorded. For example, an executable file of the software, may attempt to connect to the Internet. In this instance, the event is the action of connecting to the Internet, and the one or more associated entities are the executable file and the Internet. Therefore, the event and the entities associated with the event can be recorded in the log file 254.

At step 565, the method 500 comprises the analysis module 224 analysing the software to determine if the software is malicious. In one form, the analysis module 224 analyses the software by analysing the results of the monitor module 223 to determine if the software exhibited behaviour generally associated with a threat. The analysis module can comprise an malicious behaviour module 2241 which comprises one or more rules, which when applied to the recorded events and entities, determine whether the emulated execution of the software exhibited malicious behaviour generally associated with a threat.

In an additional or alternative form, other modules of the analysis module 224 can be applied to the software to determine if the software is malicious. These other modules of the analysis module 224 will be discussed in more detail later.

A footprint of the one or more emulated operating systems may also be analysed by the analysis module 224 to determine whether the software performed maliciously. At step 570, in the event that the software, or a portion thereof, is determined to be malicious, the method proceeds to step 575. In the event that the software was non-malicious, the method proceeds to step 580.

At step 575, the method 500 comprises the modification module 225 modifying at least a portion of the response data 250 to restrict the client processing system 230 being compromised with a threat. This step can comprise removing the software from the response data 250 and modifying the response data to indicate that the software was malicious. In another form, a malicious portion of the software can be removed. In another form, the software, or a portion thereof, can be replaced with non-malicious software, or portion thereof, retrieved from the cache module 226 as has previously been discussed.

At step 580, the wrapper component is added to the analysed response data 260, wherein the wrapper component is indicative of emulation data and/or scan data. In other optional forms, any code-signing provided with the response data can be accepted.

At step 585, the method 500 comprises the cache module 226 storing the analysed response data. The cache module 226 records in a store, such as a database, the analysed response data 260 in association with the request data 240. The cache module 261 may calculate a hash value for the analysed response data 260 and/or the request data 240 and store this in the database such that the cache can be easily searched. Other information may also be stored in the cache module 226 such as the date and/or time which the software was requested such that unsuitable recordings in the cache module 226 can be removed when appropriate.

At step 590, the cache module 226 transfers the analysed response data 260 to the client processing system 230. The analysed response data 260 may comprise the requested software. However, if the software transferred from the remote processing system 210 was determined to be malicious, then it may be possible that the software, or a portion thereof, may have been removed. It is also possible that a replacement version of the software may be comprised in the analysed response data 260, wherein the different version of the software, or portion thereof, is considered to not be malicious. In another form, the analysed response data 260 may comprise modified software, wherein one of the software's components may have been modified or replaced.

The analysed response data 260 may indicate to the user what modification, if any occurred by the proxy server 220, and the reasons for any modification.

Figure 6:
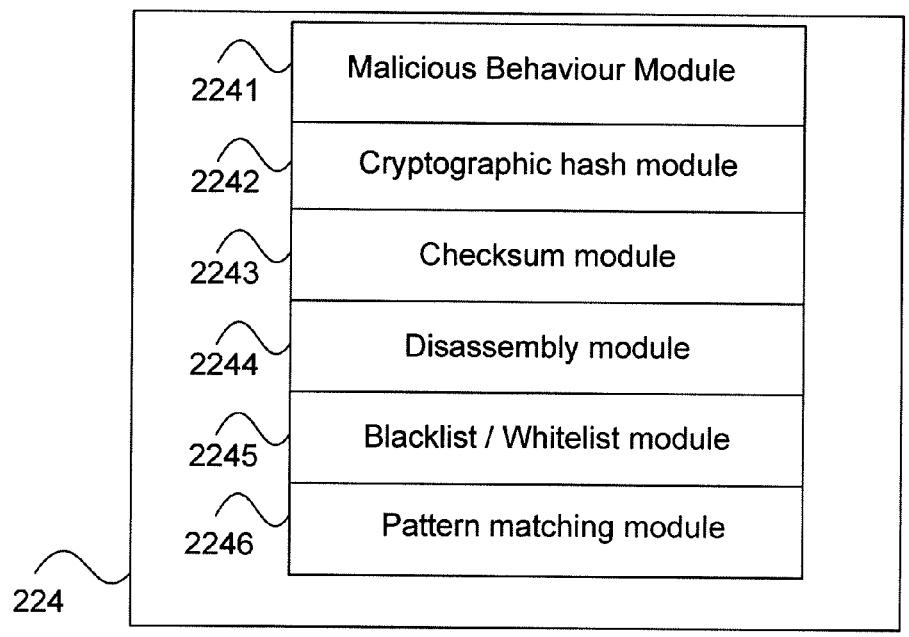
FIG. 6 illustrates a block diagram representing an example analysis module.

Referring now to FIG. 6 there is shown a block diagram of the analysis module 224.

In particular, the analysis module 224 can comprise the modules of the malicious behaviour module 2241 (as discussed above), a cryptographic hash module 2242, a checksum module 2243, a disassembly module 2244, a black-list/white-list module 2245, and a pattern matching module 2246.

The cryptographic hash module 2242 of the analysis module 224 is configured to generate a cryptographic hash value of at least a portion of the software. As the cryptographic hash value can be used as an identity, the cryptographic hash value can be used in comparisons with the blacklist/whitelist module 2245 to determine whether the at least a portion of the software is malicious.

The checksum module 2243 of the analysis module 224 is configured to determine a checksum of the software. The checksum can be compared to a database (blacklist/whitelist module 2245) to determine whether the software is malicious.

The pattern matching module 2246 of the analysis module 224 is configured to search the software or the log file 254 for particular patterns of strings, instructions, or events which are indicative of malicious activity. The pattern matching module 2246 may operate in combination with the disassembly module 2244 of the analysis module 224.

The disassembly module 2244 is configured to disassemble binary code of the software such that the disassembly module 2244 determines processing system instructions. The processing system instructions of the software can then be used by the pattern matching module 2246 to determine whether the software is malicious. Although strings of instructions can be compared by the pattern matching module 2246, the pattern matching module 2246 may be configured to perform functional comparisons of groups of instructions to determine whether the functionality of software is indicative of a threat.

The blacklist/whitelist module 2245 of the analysis module 224 comprises a list of malicious and/or non-malicious software. The blacklist/whitelist module 2245 may be provided in the form of a table or database which comprises data indicative of malicious and non-malicious software. The table may comprise checksums and cryptographic hash values for malicious and non-malicious software. The data stored in the blacklist/whitelist module 2245 can be used to determine whether the software is malicious or non-malicious.

In another optional form, the executable identifier module 229 may also be configured to identify an archive file which comprises one or more executable entities. The archived entities of the archive file may be extracted by the execution module 222. If one or more of the extracted entities, or portions thereof, are determined to be malicious, the modification module 225 modifies the one or more extracted entities, or portions thereof, accordingly and re-archives the archive file to be transferred in the analysed response data 260 to the client processing system 230.

The embodiments illustrated may be implemented as a software package or component. Such software can then be used to pro-actively seek to determine one or more malicious entities. Various embodiments can be implemented for use with the Microsoft Windows operating system or any other modern operating system. The embodiments described throughout can also be implemented via hardware, or a combination of hardware and software.

The embodiments described can be used to detect and remove a threat from a network request, such as a HTTP request or FTP download. While the current implementation is Linux (eg: Squid with ICAP enabled, WINE, QEMU) and Windows specific, the disclosed methods and systems may be applied to modern operating systems on any device comprising embedded gateway appliances such as routers and firewalls.

In some forms, the malicious assessment server 1020 may transfer restricting instructions to the relevant proxy server 1010 for restricting the software of the response data 250 compromising the client processing system 230. For example, the malicious assessment server 1020 may transfer restricting instructions which instruct the modification module 225 to quarantine particular portions of the software. In some forms, the restricting instructions may be executable by the modification module 225.

The cache module 226 may apply one or more algorithms to remove unsuitable cached analysed response data 260. Such algorithms may comprise Least Recently Used (LRU) and Least Frequently Used (LFU).

An example piece of pseudocode for implementing a method of restricting a threat compromising the client processing system is provided below:

```
010 Procedure Eventhandler OnClientRequestFile(client, fileLocation)
020 Begin
030   localFile = createTempFileName( );
040   Call download_file(fileLocation, localFile);
050   Resp = scan_file(localFile);
060   If Resp.Result == FILE_CLEAN Then Begin
070     If setting == DONT_MODIFY Then Begin
080       Call Send_File(client, localFile);
090     End Else Begin
100       Type = determine_filetype(localFile);
110       Env_Info = GetEnvironmentInfo( );
120       Call modify_file(Type, localFile, Env_Info, Resp, bCodeSign);
130       Call Send_File(client, localFile);
140     End;
150   End;
160   If Resp.Result == FILE_THREAT Then Begin
170     If setting == DONT_MODIFY Then Begin
180       Call redirect(client, info_location);
190     End Else Begin
200       Type = determine_filetype(localFile);
210       Env_Info = GetEnvironmentInfo( );
220       localInfoFile = get_localInfoFile_Name(type);
230       tempFile = createTempFileName( );
240       Call file_copy(localInfoFile, tempFile);
250       Call modify_file(Type, tempFile, Env_Info, Resp, bCodeSign);
260       Call Send_File(client, tempFile);
270     End;
280   End;
290 End;
010 Function scan_file(fileLocation) : Integer
020 Begin
030   fileType = get_file_type(fileLocation);
040   If NOT should_emulate(fileType) Then Begin
050     Return FILE_CLEAN;
060   End;
070   If NOT emulator_initialized( ) Then Begin
080     Call Initialize_database( );
090     Call Initialize_emulator( );
100   End;
      // Check whether we have emulated this file before.
      // Check involves comparing hash of fileLocation's
      // contents to a cache of hashes for already scanned files
110   If cache_emulated_before(fileLocation) Then Begin
120     Return get_cached_result(fileLocation);
130   End;
140   Call emulator_load(fileLocation);
      // numberOfSeconds may be the number of seconds to execute for
      // OR a constant such as EXECUTE_UNTIL_FINISHED
150   Call emulator_execute(numberOfSeconds, emulator_output);
160   Response = database_scan_output(emulator_output);
170   Call add_cached_result(fileLocation, Response);
180   Return Response;
190 End;
```

Optional embodiments of the present invention may also be said to broadly consist in the parts, elements and features referred to or indicated herein, individually or collectively, in any or all combinations of two or more of the parts, elements or features, and wherein specific integers are mentioned herein which have known equivalents in the art to which the invention relates, such known equivalents are deemed to be incorporated herein as if individually set forth.

Although a preferred embodiment has been described in detail, it should be understood that various changes, substitutions, and alterations can be made by one of ordinary skill in the art without departing from the scope of the present invention.

The claims defining the invention are as follows:

1. A computer-implemented method of restricting a client processing system being compromised by a threat, wherein the method comprises:

receiving, by a processor of a computing device, response data from a remote processing system, according to a request from the client processing system to download data from the remote processing system;

determining whether the response data comprises an executable file;

upon determining that the response data does not comprise an executable file, analyzing the response data to determine whether the response data is indicative of a threat to the client processing system;

generating a wrapper of the analyzed response data, wherein the wrapper is indicative of scan data;

upon determining that the response data does comprise an executable file, using, in one or more emulated operating systems of the computing device, the response data;

monitoring, by the processor, behavior of the use of the data in the one or more emulated operating systems;

analyzing the monitored behavior of the use of the data in the one or more emulated operating systems to determine whether malicious behavior indicative of a threat is detected; and in response to detecting a threat of the response data, restricting, by the processor, the client processing system being compromised with the threat of the response data, wherein restricting the client processing system comprises:

removing a portion of the response data which is associated with malicious activity; and replacing the portion removed from the response data with a non-malicious portion.

2. The method according to claim 1, wherein the method comprises:
   determining, using a cache module, if the request has previously been serviced, wherein the cache module stores analysed response data; and
   in the event that the request has previously been serviced, retrieving, using the cache module, analysed response data.

3. The method according to claim 2, wherein the method comprises:
   storing, using the cache module, analysed response data using a hash value generated based upon the response data; and
   retrieving, using the cache module, analysed response data using a hash value generated using received response data.

4. The method according to claim 1, wherein the method comprises removing a portion of the response data which is associated with malicious activity.

5. The method according to claim 4, wherein the method comprises replacing the portion removed from the response data with a non-malicious portion.

6. The method according to claim 4, wherein upon determining that the response data requires modification, the method comprises:
   generating replacement request data indicative of the data requested;
   transferring, to the cache module, the replacement request data;
   performing a search of stored analysed response data using the cache module to determine if a substantially similar request has previously been serviced; and
   receiving, from the cache module, analysed response data which at least substantially corresponds to the requested data.

7. The method according to claim 1, wherein the wrapper is indicative of scan data, the scan data being indicative of at least one of:
   a version of a signature database used to analyze the response data;
   time and/or data of conducting the analysis;
   type analysis module and sub-modules used to analyze the response data;
   a version number of the analysis module and the sub-modules;
   a size of the response data;
   a file location; and
   an indication as to whether the response data was code-signed.

8. The method according to claim 1, wherein the step of generating the wrapper comprises configuring the wrapper to intercept use or execution of the data by the client processing system, wherein the wrapper, upon interception of the use or execution of the data, presents the scan data.

9. The method according to claim 1, wherein the method comprises generating the wrapper to present a prompt requesting input regarding whether the data is to be executed or used by the client processing system, quarantined, or deleted.

10. The method according to claim 1, wherein the method comprises:
    recording one or more events that occur during use of the data by the one or more emulated operating systems; and
    analysing the one or more events to determine whether the use of the data exhibits behaviour which is indicative of a threat.

11. The method according to claim 1, wherein the method comprises:
    selecting, in the proxy server and in accordance with the data downloaded, the one or more emulated operating systems from a plurality of emulated operating systems; and
    using the one or more emulated operating systems with the data to monitor the use of the behaviour of the data.

12. The method according to claim 1, wherein in the event that the data downloaded is executable, the step of using the data comprises executing the data.

13. A system to restrict a client processing system being compromised with a threat, wherein the system comprises:
    a processor;
    memory in electronic communication with the processor;
    the processor configured to receive response data from a remote processing system, according to a request from the client processing system to download data from the remote processing system;
    the processor configured to determine whether the response data comprises an executable file;
    upon determining that the response data does not comprise an executable file, the processor configured to analyze the response data to determine whether the response data is indicative of a threat to the client processing system;
    the processor configured to generate a wrapper of the analyzed response data, wherein the wrapper is indicative of scan data;
    upon determining that the response data does comprise an executable file, an emulation module configured to use, in one or more emulated operating systems of the system, the response data;
    a monitor module configured to monitor behavior of the use of the data in the one or more emulated operating systems;
    the processor configured to analyze the monitored behavior of the use of the data in the one or more emulated operating systems to determine whether malicious behavior indicative of a threat is detected; and
    in response to detecting a threat of the response data, a modification module configured to restrict the client processing system being compromised with the threat of the response data, wherein restricting the client processing system comprises the modification module being configured to:
    remove a portion of the response data which is associated with malicious activity; and
    replace the portion removed from the response data with a non-malicious portion.

14. The system according to claim 13, wherein the proxy server is configured to be executed at the client processing system.

15. The system according to claim 13, wherein the proxy server is configured to be executed at a second processing system in data communication with the client processing system.

16. The system according to anyone of claims 13, wherein the system comprises an analysis module configured to analyse the response data, wherein the analysis module comprises at least one of:
    a cryptographic hash module;
    a checksum module;
    a disassembly module;
    a black-list and/or white list module; and
    a pattern matching module.

17. A computer program product comprising a non-transitory computer readable medium having a computer program recorded therein or thereon, the computer program enabling restriction of a client processing system being compromised by data downloaded from a remote processing system, wherein the computer program product configures the client processing system or a second processing system in data communication with the client processing system to:

receive, in a proxy server, response data from a remote processing system, according to a request from the client processing system to download data from the remote processing system;

determine whether the response data comprises an executable file;

upon determining that the response data does not comprise an executable file, analyze the response data to determine whether the response data is indicative of a threat to the client processing system;

generate a wrapper of the analyzed response data, wherein the wrapper is indicative of scan data;

upon determining that the response data does comprise an executable file, use, in one or more emulated operating systems of the proxy server, the response data;

monitor behavior of the use of the data in the one or more emulated operating systems;

analyze the monitored behavior of the use of the data in the one or more emulated operating systems to determine whether malicious behavior indicative of a threat is detected; and in response to detecting a threat of the response data, restrict the client processing system being compromised with the threat of the response data, wherein restricting the client processing system comprises:

removing a portion of the response data which is associated with malicious activity; and replacing the portion removed from the response data with a non-malicious portion.

* * * * *